US010013538B1

(12) United States Patent
Wyon et al.

(10) Patent No.: US 10,013,538 B1
(45) Date of Patent: Jul. 3, 2018

(54) MATCHING ACCOUNTS IDENTIFIED IN TWO DIFFERENT SOURCES OF ACCOUNT DATA

(71) Applicant: Connect Financial LLC, Wellesley, MA (US)

(72) Inventors: Jennifer Hillary Elizabeth Wyon, Belmont, MA (US); Rachael Thomas Acker, West Roxbury, MA (US); Joshua Matthew Eaker, West Roxbury, MA (US); Martin Frenzel, Wayland, MA (US); Allen Charles Madsen, Boston, MA (US); Jeremy Mark Isikoff, Brookline, MA (US); Madison Elizabeth Packer, Somerville, MA (US)

(73) Assignee: Connect Financial LLC, Boston, MA (US)

(*) Notice: Subject to any disclaimer, the term of this patent is extended or adjusted under 35 U.S.C. 154(b) by 0 days.

(21) Appl. No.: 15/681,482

(22) Filed: Aug. 21, 2017

(51) Int. Cl.
*G06F 21/00* (2013.01)
*G06F 21/31* (2013.01)
*G06F 21/62* (2013.01)
*G06Q 40/00* (2012.01)

(52) U.S. Cl.
CPC .......... *G06F 21/31* (2013.01); *G06F 21/6245* (2013.01); *G06Q 40/00* (2013.01)

(58) Field of Classification Search
None
See application file for complete search history.

(56) References Cited

U.S. PATENT DOCUMENTS

| | | | | |
|---|---|---|---|---|
| 6,182,142 | B1* | 1/2001 | Win | G06F 21/604 709/219 |
| 8,121,941 | B2* | 2/2012 | Matthews | G06Q 10/04 705/39 |
| 8,313,022 | B2* | 11/2012 | Hammad | G06F 21/34 235/375 |
| 9,710,852 | B1* | 7/2017 | Olson | G06Q 40/025 |
| 2003/0191703 | A1* | 10/2003 | Chen | G06Q 40/02 705/36 R |
| 2011/0313898 | A1* | 12/2011 | Singhal | G06F 21/34 705/30 |
| 2012/0116976 | A1* | 5/2012 | Hammad | G06F 21/34 705/67 |
| 2014/0095363 | A1* | 4/2014 | Caldwell | G06Q 20/10 705/35 |
| 2014/0136346 | A1* | 5/2014 | Teso | G06O 30/06 705/14.72 |

(Continued)

*Primary Examiner* — Maung T Lwin
(74) *Attorney, Agent, or Firm* — Fish & Richardson P.C.

(57) ABSTRACT

Among other things, first and second sets of authentication credentials are used to access respectively data about a first set of one or more accounts from a first source and data about the one or more of the second accounts from the a second source. The data are analyzed to identify (a) one account of the first set of one or more accounts and (b) the one of the one or more of the second accounts as possibly a single account. After information is presented to a user an indication is received from the user that they are a single account. For a computation that requires data about the single account, data from the first source or data from the second source or data from both are used, based on a predefined computational rule.

8 Claims, 20 Drawing Sheets

(56) References Cited

U.S. PATENT DOCUMENTS

Figure 1:
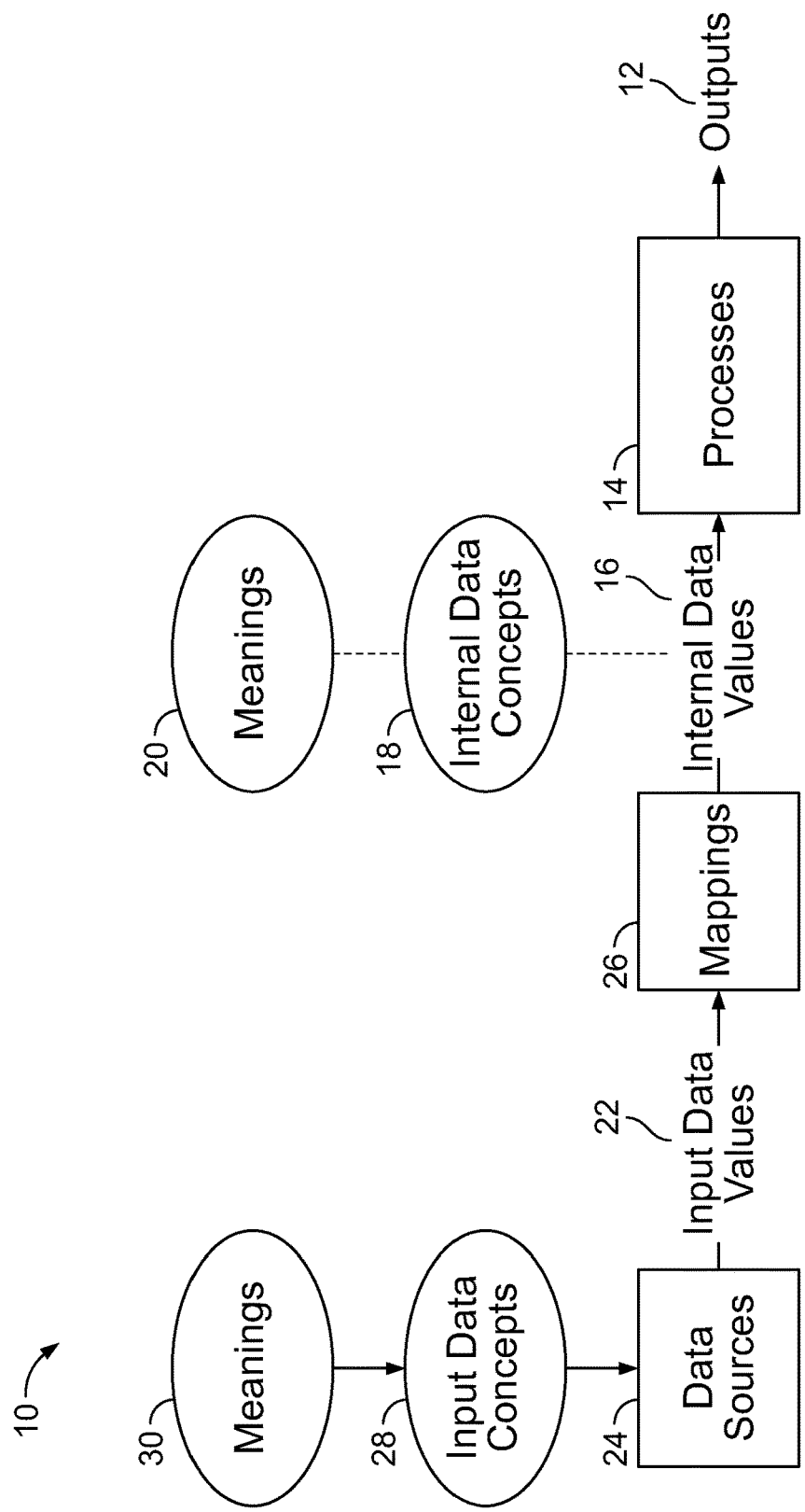

2014/0237570 A1* 8/2014 Shishkov ............ G06F 21/316
726/7
2016/0140858 A1* 5/2016 Adderly ................ G09B 7/02
704/9

* cited by examiner

| Field | Description |
|---|---|
| ci.total_current_debt | the sum of all debt the user holds |
| ci.fico_score | the fico score of the user |
| ci.debt_to_income_ratio | the sum of all debt the user pays per month divided by the user's income |
| ci.employed_less_than_12_months | true/false around the user's length of employment being less than a year |
| ci.number_delinquencies_last_2_years | the count of all delinquencies that the user has had in the past 2 years |
| ci.gross_annual_income | the gross annual income of the user |
| ci.number_credit_inquires_last_6_months | the count of all credit inquiries the user has had in the past 6 months |
| ci.number_total_debt_accounts | the count of all debt accounts the user has |
| ci.total_utilization_all_credit_cards | the sum of balances on all cards divided by the sum of all credit lines for ea |
| ci.total_balance_all_credit_cards | the sum of all current balances on all credit card accounts |
| ci.credit_history_length | the length, in months, of the user's credit history |
| ci.number_public_bankruptcies | the count of public bankruptcies that user has had |
| ci.number_tax_liens | the count of all tax liens that the user has had |
| ci.debt_repayment_months_at_0_percent | the number of months it would take the user to repay the debt back while |
| ci.afford_7_year_personal_loan | true/false around if the user can afford a 7 year personal loan |
| ci.affordable_debt_payment | the monthly payment amount deemed the max affordable month payment |
| ci.average_estimated_apr_all_credit_cards_current_month | the mean of all estimated current interest rates across all credit card accounts |
| ci.average_estimated_apr_all_credit_cards | the mean of all estimated interest rates across all credit card accounts |
| ci.zero_percent_revolver | true/false around if the credit_card_behavior_revolver_0_percent_count is |
| ci.available_cash_for_debt | the amount of cash the user has available to put towards debt payments |
| ci.average_monthly_net_cash_flow_all_checking_accounts | the mean monthly balance change for all checking accounts |

FIG. 6 logout　　　cinch

CREDIT PROFILE

Please verify your identity

First Name

Last Name

Street Address

State

Zip Code

Social Security #

Date of Birth

☐ By submitting this registration form and checking the box, I understand that I am providing written instructions that I am providing written instructions in accordance with the Fair Credit Reporting Act and applicable law for Cinch Financial to request and receive information about me from third parties including, but not limited to, a copy of consumer credit report and score from consumer reporting agencies at any time for so long as I have a Cinch account for Cinch to use to provide its services in accordance with Cinch Financials Terms of use and Privacy Policy.

next

FIG. 12

| logout | cinch |
|---|---|

ACCOUNT LINKING

ⓘ Your primary checking account is required for Cinch to calculate your finances.

Link your bank & credit cards

If you have multiple accounts, start with your primary income & bill payment accounts Institution name 🔍 search

POPULAR INSTITUTIONS

| | American Express Credit Card<br>http://www.americanexpress.com/ | > |
|---|---|---|
| | Bank of America<br>http://www.bankofamerica.com/ | > |
| | Barclaycard US<br>http://www.barklaycard.com/ | > |
| | BB&T – Online Banking<br>http://www.bbt.com/ | > |
| | Capital One 360<br>http://secure.capital360.comnmyaccount/banking/login.vm | > |
| | Capital One Credit Card<br>http://www.capitalone.com/indexaphp | > |
| | Chase Bank<br>http://www.chase.com/ | > |

FIG. 14

 Money In & Money Out average monthly money coming in average monthly expenses

Your total expenses in the past 90 days were $17, 250.00 You've spent less than your monthly Income.

Based on the last 3 months you spend an average of $72.18 a month on credit cards We found $21.00 in checking fees.

 Debt & Credit current debt   $1,000.00 debt incurred last month   $0

Your credit score of 800 is Excellent.

You have revolving debt on 1 credit card.

Last month, your debt stayed the same.

 Available Cash savings account   $300.00 checking account   $750.00 other cash   $10,000.00 budget expense   $0

You have $11,050.00 – more than 1 month of your monthly expenses in a rainy day fund.

FIG. 22

| MY ACCOUNTS | |
|---|---|
| LINKED | |
| 🏛 Cinch Financial V2 checking | |
| CURRENT BALANCE | $750.00 |
| 🏛 Cinch Financial V2 credit card | |
| CURRENT BALANCE | $1000.00 |
| 🏛 Cinch Financial V2 savings | |
| CURRENT BALANCE | $300.00 |
| OTHER | |
| 💰 Other Money | AMOUNT $10,000.00 |
| 🪙 Budget Expense | AMOUNT $0 |

If your expenses look higher or your income lower that expected, it may be because we're not seeing a complete picture. You may need to link another account.

Ready to get your customized Cinch strategies?

next

FIG. 23

MATCHING ACCOUNTS IDENTIFIED IN TWO DIFFERENT SOURCES OF ACCOUNT DATA

This description is related to a description contained in U.S. patent application Ser. No. 15/593,870, filed May 12, 2017, and incorporated here by reference.

BACKGROUND

This description relates to matching accounts identified in two different sources of account data. As shown in FIG. 1, typical data processing systems 10 produce outputs 12 by applying specified processes 14 to internal data values 16 that represent internal data concepts 18 having particular meanings 20. At least some of the internal data values can be derived from input data values 22 provided by one or more data sources 24 using mappings 26 that address the fact that input data values available from the sources represent input data concepts 28 that have meanings 30 that may not directly match the meanings of the internal data concepts intended by the developer of the system. The mappings are predefined when the system is built—based on the characteristics of the data sources and the data values that they provide—and remain unchanged to assure that, for example, numerical outputs generated by the system conform to the intentions of the designer of the system.

For example, a system may be designed to use an internal data concept of "annual percentage rate (APR) of interest on a credit card debt." The system may use that internal data concept in a computational process that generates an output representing an "annualized cost of the interest based on the current balance" by multiplying internal data values for an "APR" internal data concept by internal data values for an "outstanding-balance" internal data concept. For this purpose, the system needs to determine the internal data values based on input data values.

In this example, suppose that there are two sources (source A and source B) of input data values related to the APR internal data concept and that neither of the sources may be expected always to provide input data values that square exactly with the developer's intended meaning of the APR internal data concept although one or the other of both of them may provide useful information related to that internal data concept. Based on characteristics of sources A and B and the data values that they provide, the developer may decide to attribute to the APR internal data concept the meaning "the higher of the APRs provided by source A and source B." The designer in typical known systems would then specify a corresponding, unchanging mapping from the data values provided by sources A and B to the data values for APR to be used by the system in producing the output.

Input data values related to an internal data concept can be obtained from sources external to the system, such as a data vendor, or internal to the system, such as a company's own databases of enterprise resource planning information, financial information, or customer relationship management information, among others.

SUMMARY

In general, in an aspect, a first set of authentication credentials is received for access to a first source of data about a first set of one or more accounts of a user. The first set of authentication credentials is used to access data about the first set of one or more accounts from the first source. A second set of authentication credentials is received for access to a second source of data about one or more second accounts. The second set of authentication credentials is used to access data about the one or more of the second accounts from the second source. The data about the first set of one or more accounts and the data about the one or more of the second accounts are analyzed to identify (a) one account of the first set of one or more accounts and (b) one of the one or more of the second accounts as possibly a single account. Information is presented to the user identifying the one account of the first set of one or more accounts and the one of the one or more of the second accounts. An indication is received from the user that the one account of the first set of one or more accounts and one of the one or more second accounts are a single account. For a computation that requires data about the single account, data from the first source or data from the second source or data from both are used, based on a predefined computational rule.

Implementations may include one or a combination of two or more of the following features. The data accessed from the first source of data includes a credit report. The second source of data includes a financial institution. The first set of one or more accounts includes credit accounts. One or more of the second accounts includes a credit account. The first set of authentication credentials are received by interaction with the user through a user interface. The second set of authentication credentials are received by interaction with the user through a user interface. The computer maintains an ontology of data concepts. The data about the one account of the first set of one or more accounts and the data about the one of the one or more of the second accounts are associated with respective data concepts of the ontology. The predefined computational rule has inputs that include a data concept associated with data about the one account of the first set of one or more accounts and a data concept associated with data about one or more of the second accounts. The output of the predefined computational rule includes data associated with the single account. The data about the first set of one or more accounts and the data about the one or more second accounts is analyzed to identify (a) one or more additional accounts of the first set of one or more accounts and (b) corresponding one or more additional second accounts as possibly single accounts.

These and other aspects, features, and implementations can be expressed as methods, apparatus, systems, components, program products, methods of doing business, means or steps for performing a function, and in other ways.

These and other aspects, features, and implementations will become apparent from the following descriptions, including the claims.

DESCRIPTION

Figure 7:
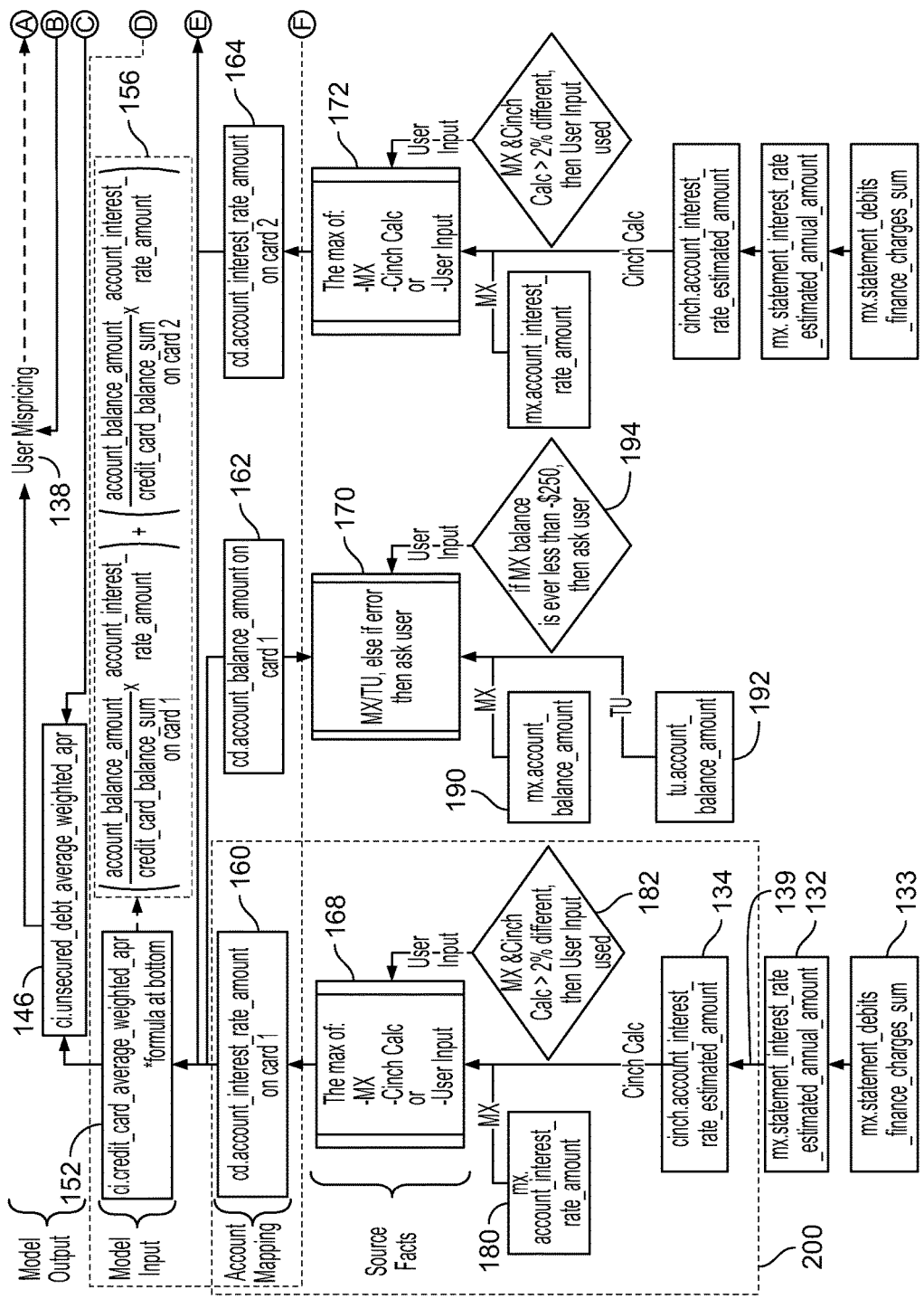
Figure 7:
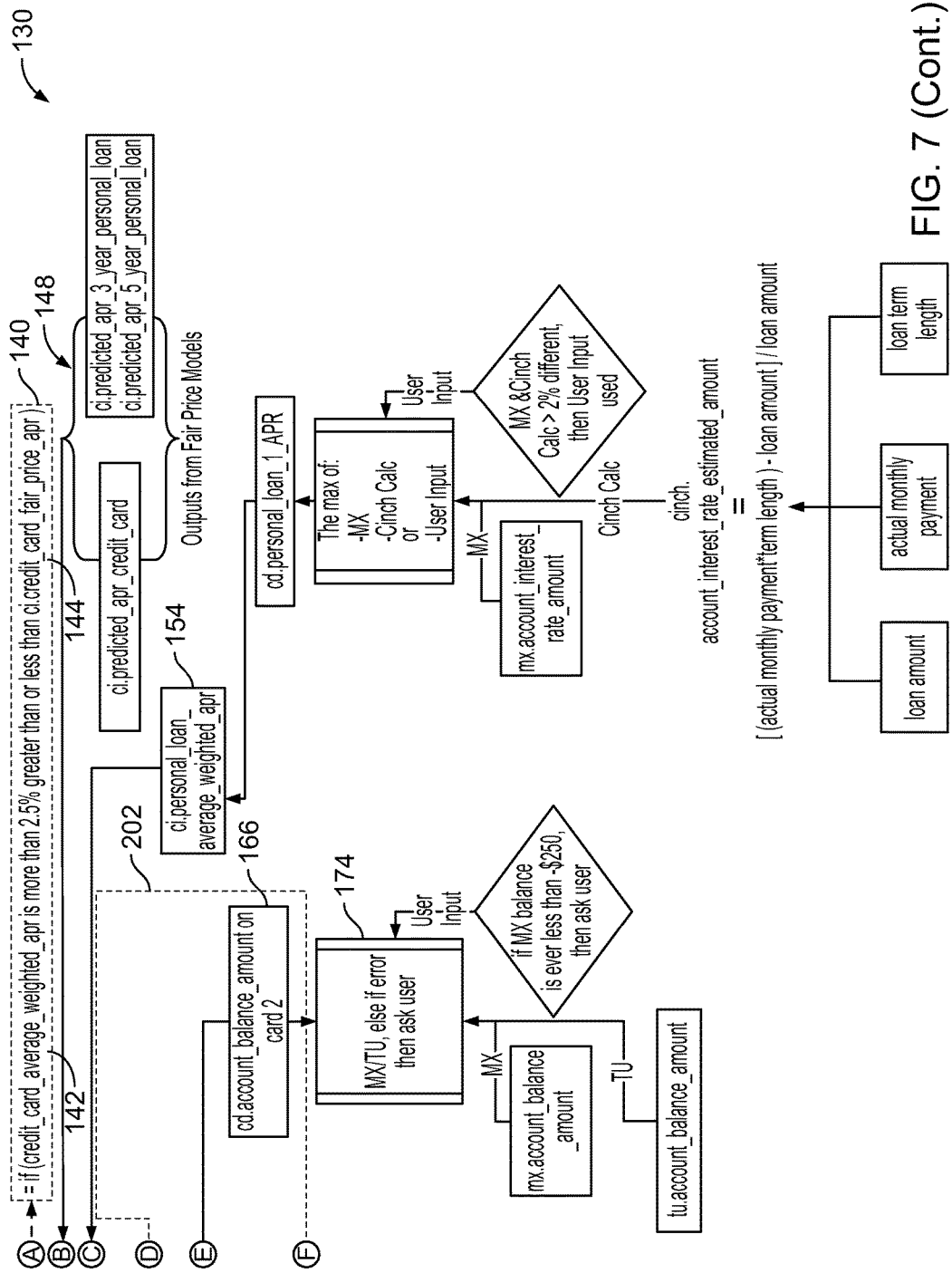

FIGS. 1, 2, 3, 5, and 8 are block diagrams.
FIG. 4 is a diagram of ontologies.
FIG. 6 is a data concept list.
FIG. 7 is a user interface display.
FIG. 9 is a sequence diagram.
FIGS. 10 through 23 are screens of a mobile device.

Figure 2:
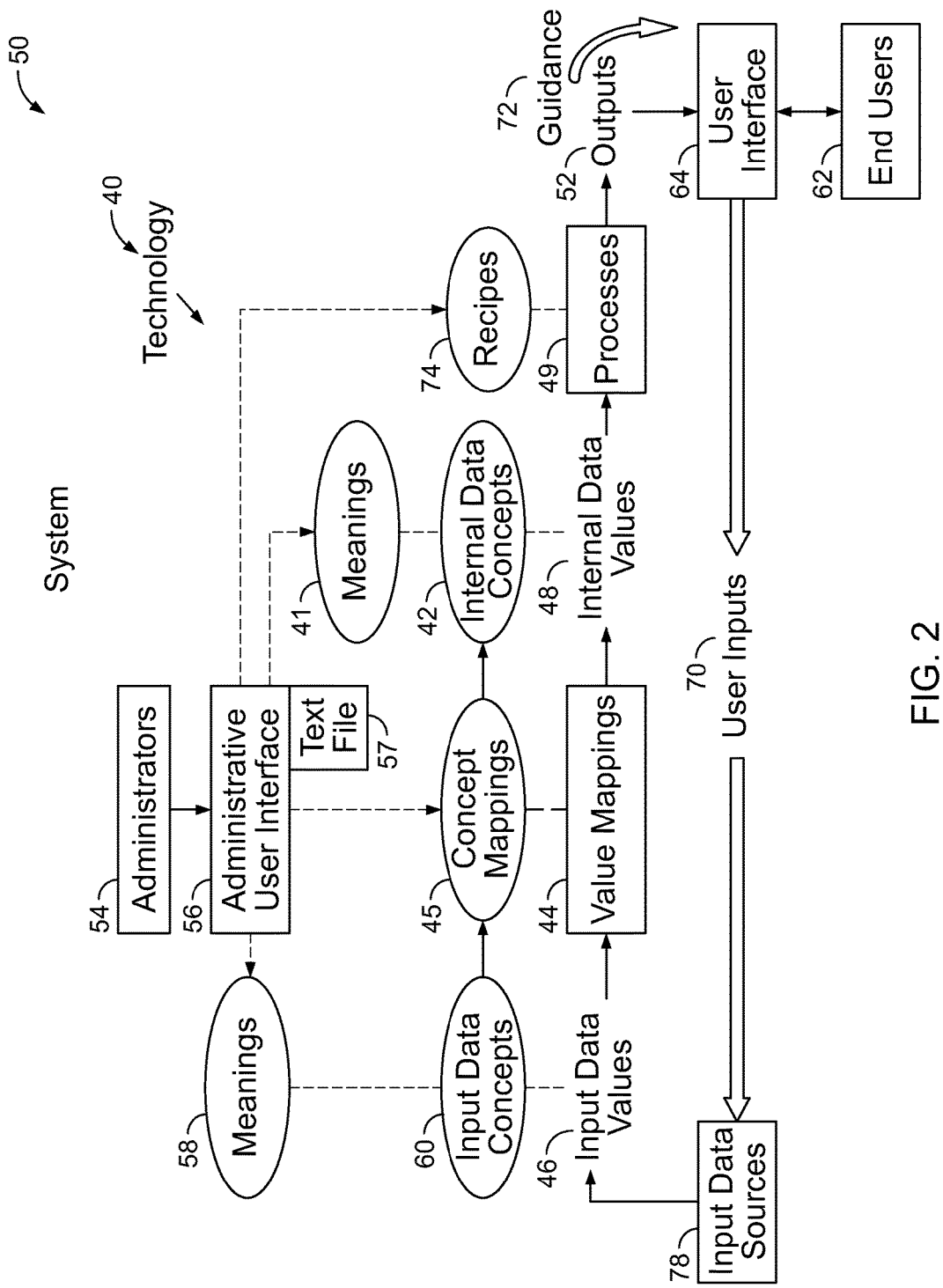

As shown in FIG. 2, here we describe technology 40 that enables meanings 41 that will be attributed to internal data concepts 42 (and the corresponding mappings 44 from input data values 46 to internal data values 48 that correspond to the internal data concepts) to be determined at any time, including after the technology 40 or the system 50 of which it is part has been developed and built and even as late as run-time, when the technology 40 is generating internal data values or the system 50 is generating outputs 52 based on the data input values and internal data values using processes 49. In some implementations, one or more of the internal data concepts are associated with accounts such as credit card accounts of an end user. The internal data concepts can include, for example, the account identifiers, unpaid balances, interest rates, and other attributes of such accounts. Input data values can include values of such attributes expressed in accordance with input data concepts of the source of the data values. Internal data values can include such attributes expressed in accordance with internal data concepts. There may be mappings between such input data values for such accounts and corresponding internal data values for the accounts. In order to produce useful outputs 52, e.g., guidance 72, about such accounts, it is desirable for the system to include in its internal data concepts information about as many (usefully all) of the user's accounts as possible, and to be able to treat duplicate internal data concepts for a given account as a single account so that the treatment of the internal data concepts is complete and the use of corresponding internal data values is non-duplicative.

We sometimes refer to three stages in the operation of the system 50 (and its technology 40) and to three categories of people who participate in those stages: development time, configuration time, and run time. During development time, the system is being designed and built by developers. During configuration time, administrators 54 typically employed by business users of the system can work through an interactive graphical user interface 56 (or in other ways) to configure the technology, for example, by defining computational recipes (discussed later), meanings 58, 41 to be attributed to input data concepts 60 and internal data concepts 42, and concept mappings 45 of meanings among input data concepts and internal data concepts, among other things. Run time is when, typically, end users 62 are interacting with the system 50 through a user interface 64 that is presented by a browser or a mobile app, for example. During runtime, input data values and internal data values are being processed to generate premises and outputs for the end users, among other activities. In general, the three stages may overlap in time and in function, and the same people may be developers and administrators or administrators and end users. For example, configuration time and run time may overlap in that administrators can be altering the definitions, meanings, recipes, and mappings in real time as the end users are interacting with the system. Administrators need not be specially trained in computer or software technologies, but only need be able to deal with and express the meanings of data concepts and how they are to be mapped from and to other data concepts.

We use the term "mapping" broadly to include, for example, any translation, transformation, computation, combination, or other conversion from one or more inputs to one or more outputs, such as a mapping from one or more data concepts to one or more other data concepts. A mapping of concepts (which we sometimes refer to as a concept mapping) can be applied to data values during run time. We sometimes refer to a mapping applied to data values as a value mapping.

We use the term "meaning" broadly to include, for example, any definition, connotation semantic, explanation, understanding, or interpretation, or combinations of them of a subject, such as a data concept or a data value, to name two.

We use the term "internal data concept" broadly to include, for example, any notion, view, thought, or conception about data and that is of use (among other places) internally to the technology 40 or to the system 50.

We use the term "input data concept" broadly to include, for example, any notion, view, thought, or conception about input data and that is of use (among other places) externally to the technology 40 or to the system 50.

We use the term "recipes" broadly to include, for example, any analytical, mathematical, statistical, or logical process, or combination of them that can be applied to one or more inputs to generate one or more outputs. The inputs can include, for example, internal data values or input data values or premises, and the outputs can be premises used within a system or provided as outputs of the system.

In some implementations, the technology 40 receives input data values and produces internal data values using the mappings. One or more of the internal data values that it produces can then be used as inputs by other parts of the system 50, notably the processes 49 that use recipes to produce premises and ultimate outputs 52 to be provided to end users.

The technology 40 (and the overall system 50 of which it is part) is useful in contexts, among many others, in which interactions through the user interface 64 with human users 62 extend over a period of time (e.g., days, months, years, or decades) and are used to advise or otherwise guide the users with respect to an aspect of the user's activities or behavior sometimes with the goal of improving an outcome of the activities or behavior. The system 50 provides guidance that is useful even though the users may at times act irrationally, ignore the guidance, or take a different course than the one suggested. The outputs of the system (the guidance) can be numerical, non-numerical, or a combination of the two, and can be expressed in a variety of ways, such as possibilities, suggestions, hypothetical scenarios, questions, or challenges, among others. The interactions may occur in sequences in which the user provides inputs 70 (which can be treated as part of the input data values 46), the system provides guidance 72 in the form of outputs, the user provides other inputs, and the system provides other guidance, iteratively, without necessarily reaching a defined end point. In some examples, the guidance is intended to be a sequence of directionally correct pieces of advice that change over time as the context is monitored.

In some cases, the outputs 52 are generated by statistical processes or analytical processes or combinations of them that are part of system 50 and are configured by administrators during configuration time or run time. The guidance to the user (represented in the outputs of the system) are based on "recipes" 74 defined by the administrators. The recipes are executed by processes 49 at run time to generate premises based on internal data values 48. The outputs 52 are based on the premises. Additional information describing examples of features of system 50 are included in U.S. patent application Ser. No. 14/304,633, filed Jun. 13, 2014; Ser. No. 14/989,935, Jan. 7, 2016, and Ser. No. 15/231,266, filed Aug. 8, 2016, which are incorporated here by reference.

The technology 40 and the overall system 50 are especially useful in contexts that have one or more of the following characteristics:

a. A given data source 78 and the input data values that it provides have characteristics that affect the meaning, significance, and usefulness of the values, including one or more of: reliability, availability, currency, accuracy, consistency, and precision, among others.

b. The behavior of a user related to the guidance provided by the system may be unpredictable, unreliable, or unresponsive.

c. The guidance to the user is intended to be effective over time periods during which the context, data sources, meanings of data concepts, behavior of users, or desired outcomes, or combinations of them, among other things, will change.

Although we describe examples of the technology 40 and system 50 related to financial contexts and particularly examples that involve providing guidance to end users who are consumers with respect to activities and behavior related to their financial situations, the technology 40 and the system 50 are applicable to a very wide variety of contexts including realms other than financial, and financial examples other than those related to consumer guidance.

One or more of the recipes 74, which are executed in the processes 49, use internal data values 48 to generate premises that are the basis of the outputs 52. For the recipes to work properly, the internal data concepts that are the basis of the internal data values used by the recipes must conform to the defined meanings 41, and the administrators and the technology must be able to rely on the defined meanings; otherwise the system will operate in a garbage in/garbage out mode. Therefore, when the administrator specifies an internal data concept, say, "APR of a credit card," as an input data concept of a recipe, she must be confident that the corresponding internal data values will conform to the defined meaning of "APR of a credit card", a meaning that she is aware of and understands. This meaning of "APR of a credit card" could be "A credible estimate of the annualized interest expense of carrying a balance on a specified credit card."

On the other hand, although the input data sources 78 may base the input data values 46 that they provide on their own defined input data concepts 60 (or ones that can be inferred by or interpreted by an administrator of the technology 40), none of those input data concepts may match the internal meaning "APR of a credit card" as "A credible estimate of the annualized interest expense of carrying a balance on a specified credit card." For example, one input data source may provide input data values that are accurate but not current. Another input data source may provide data values that are current but not accurate. A third input data source may provide credible current values but not provide them reliably; they may be sometimes available and sometimes not. In other words, in a variety of examples, the source meaning of an input data concept may not match the internal meaning for that data concept. Even so, a developer who is familiar with the characteristics of the sources and the meanings of their data concepts may be able to define a mapping 74 from the input data concepts of the data values provided by one or more sources for a given data concept to the internal data concept enabling the intended meaning of the internal data concept to be met. Then at run time, for example, the system can receive input data values for the input data concepts from those sources, transform them based on the mappings to internal data values for the internal data concept, and provide them to the premise generators.

As an example, internal data values for the "APR of a credit card" might be obtained by a mapping that instructed the technology to accept the values of source A without modification if source A, known to be unreliable in its availability, is actually making values available; otherwise to combine the values of source B weighted 75% with the values of source C weighted 25%.

Significantly, the mapping is applied at run time, and the mapping can be altered freely by the administrators at configuration time or run time or both. Alterations may be prompted by changes in the characteristics of the input data sources, the input data concepts and meanings, the intentions and interpretations of the administrator, and for a wide variety of other reasons and combinations of them.

Therefore, the effect of applying a mapping is determined at the time when internal data values of the internal data concept are needed by, for example, the processes 49 based on recipes 74 or mappings 44 and may change at any time up to the moment when the mapping is applied. For example, at a first time, T1, a mapping to "APR of a credit card" may specify that data sources B and C be weighted 75% to 25%. At time T2, an administrator may determine that a more credible value will be generated by changing the mapping so that the weightings are 50% and 50%. The administrator may make the change easily by interacting with controls of the user interface 56 or in other ways (for example altering a text file). After time T2 whenever "APR of a credit card" is needed the new weightings will be applied. As a result, the manner in which input data concepts are used for formulating a corresponding internal data concept can change over time and therefore the meaning of "APR of a credit card" can change over time. That meaning is not fixed at development time nor is it fixed at configuration time.

Although we have so far discussed input data concepts and internal data concepts and their related meanings individually, data sources typically organize categories of their data according to ontologies or the existence of such ontologies is explicit or can be inferred. The internal data concepts and related meanings of the technology 40 also can be organized according to one or more internal ontologies. By understanding, defining, and taking advantage of ontologies of input data concepts and internal data concepts, administrators can more easily develop mappings from categories of input data concepts to categories of internal data concepts. Ontologies can be expressed in a variety of ways including database schemas, the Resource Description Framework (RDF) of the World Wide Web Consortium (W3C), and others.

We use the term "ontology" broadly to include, for example, any organizational framework for meanings or concepts, such as a hierarchy, a tree, a classification, a ranking, a scale, an ordering, an outline, an arrangement, or combinations of them, to name a few.

Figure 3:
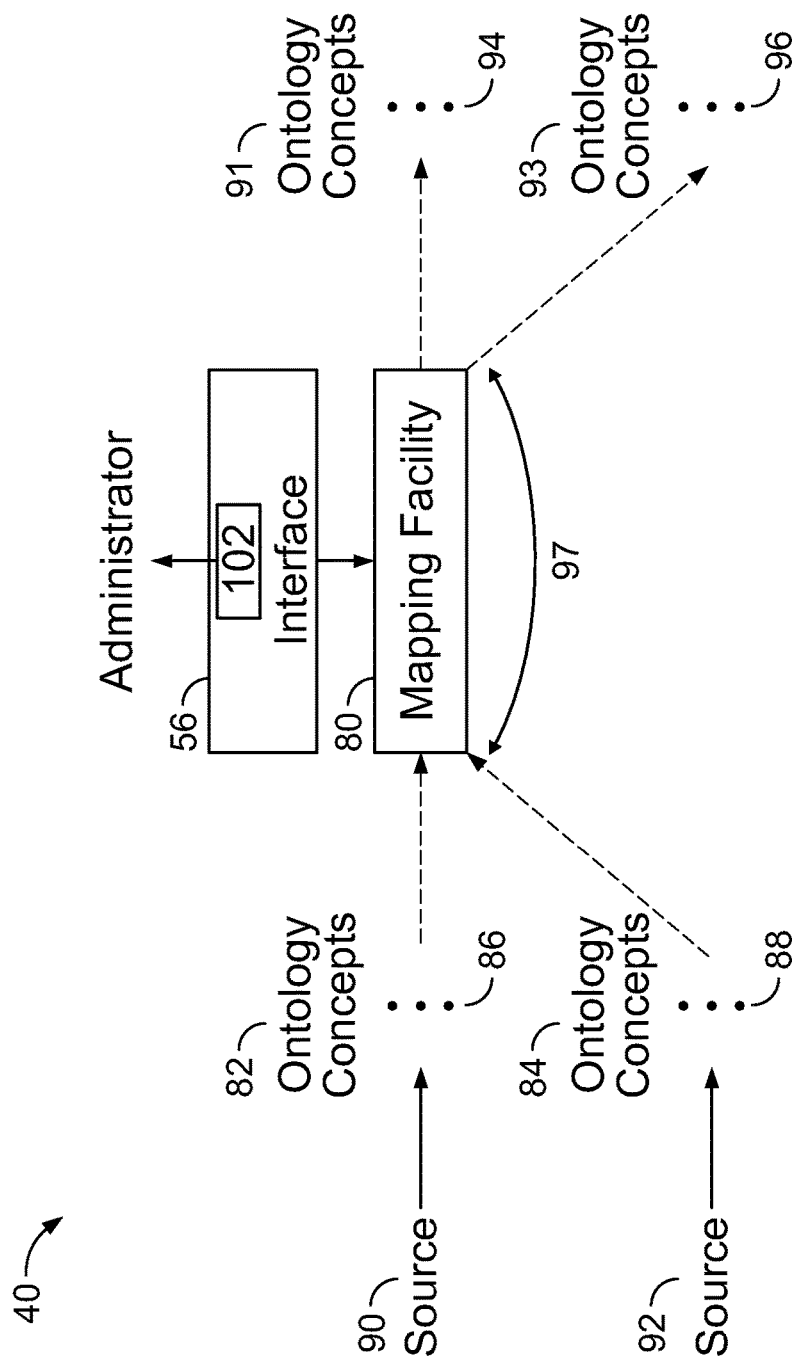
Figure 4:
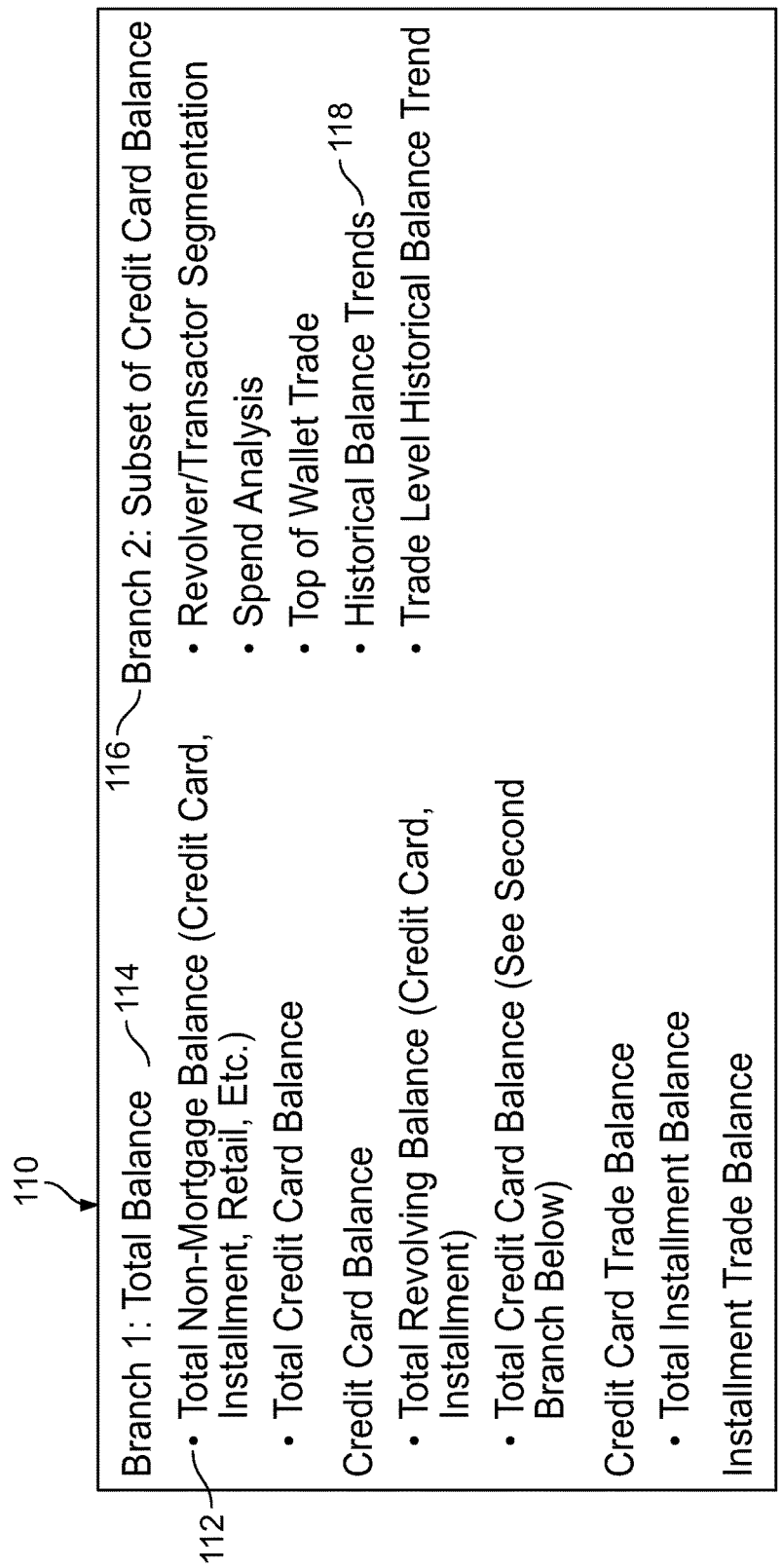

As shown in FIG. 3, the technology 40 provides a mapping facility 80 that can be made available to administrators through an interactive user interface 56 (or in some cases by editing of a text file) that enables mediation between existing ontologies 82, 84 of input data concepts 86, 88 of input data sources 90, 92 and internal ontologies 91, 93 of internal data concepts 94, 96. In defining the mappings, the administrators are able to express and change complex relationships 97 that map any M input data concepts to any N internal data concepts. The complex relationships can be created and updated at any time up to and including during run time even while end user outputs are being generated. The technology 40 could include a comprehensive graphical user interface 102 to enable administrators to observe, understand, manipulate, alter, organize, and define data concepts, ontologies, mappings, and relationships among them. In some implementations, the information about the mappings can be stored, observed, understood, manipulated, altered, organized, and defined in a simple text file and manipulated by a user through a text editor.

As shown in FIG. 4, for example, an ontology 110 of a data input source may include a hierarchy of input data concepts 112 headed by the input data concept "total balance" 114. That concept has (e.g., is the sum of) two main component data concepts: "total non-mortgage balance" and "total credit card balance". "Total credit card balance" in turn has (e.g., is the sum of) three components: "credit card balance," "credit card trade balance," and "installment trade balance." And so on. At the same time, in this example, suppose that the technology 40 includes an internal data concept "subset of credit card balance" 116 that has five internal data concepts 118 under it. The administrator can use the mapping facility to define mappings from one or more of the (M) input data concepts to one or more of the (N) internal data concepts.

Figure 5:
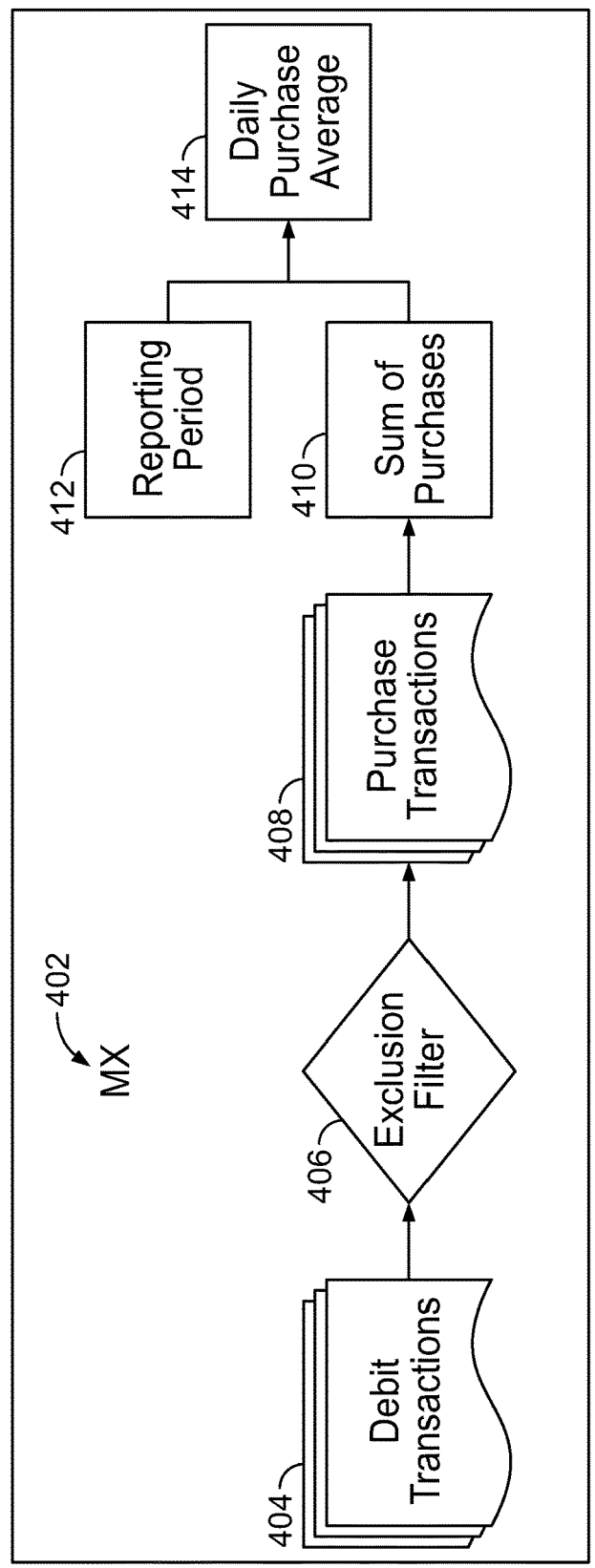

An example of a complete version of an ontology of internal data concepts follows:
Total Debt Balance
    Total Secured Debt Balance
    Total Unsecured Debt Balance
    1 Total Unsecured Debt Balance
        Total Personal Loan Debt Balance
        Total Credit Card Debt Balance
    2 Total Credit Card Debt Balance (sum of trades below)
        Credit Card account status revolving=True (for 1 or more trades, see 2nd branch)
        Credit Card account balance (for 1 or more trades)
    3 Credit Card account balance
        Credit Card balance MX
        Credit Card balance TU
        Credit Card balance user The mappings can refer not only to input data concepts and internal data concepts as objects but also to subjects and relationships. For example, a mapping can express a relationship between input data concepts and an internal data concept as a formula to be applied to the input data concepts to obtain the internal data concept. In some cases the subject of the mapping can be the relationship and the internal data concept produced by the mapping can be the formula itself. FIG. 5 illustrates an example of a mapping from input data values of a data source to an internal data value. A data source 402 makes available debit transactions 404 of a card holder. By applying an exclusion filter, the transactions that involve purchases 408 can be derived. The purchase values of those transactions can be summed 410 and divided by a period 412 represented by the transactions to generate a daily purchase average 414 for that period. Items 410, 412, 414 represent internal data values associated with internal data concepts while items 404, 406, and 408 represent input data values associated with input data source concepts.

As shown in FIG. 6, technology 40 can use a list 122 of unique internal data concepts 123 and descriptions 124 of each of them. For example, the uniquely named internal data concept ci.debt_to_income_ratio 123 is described as having the meaning "the sum of all debt the user pays per month divided by the user's income" 124.

FIG. 7 illustrates how mappings and recipes can be used to produce internal data concepts from input data concepts and to produce premises and outputs from internal data concepts. FIG. 7 also illustrates how mappings and recipes can vary their use of input data concepts depending on a time frame under consideration; in other words, the recipes can operate dynamically (non-statically). The boxes and lines of FIG. 7 represent input data concepts, internal data concepts, mappings, processes that use the internal data concepts and input data concepts to produce premises and outputs, and the flow of information among these elements.

Many of the blocks in the bottom half of FIG. 7 represent input data concepts, for example, input data concepts such as 132 that begin with the characters "mx" represent input data concepts of input data values provide by an input data source MX. The remainder of the identifier of each concept specifies a unique input data concept for that input data source, in accordance with an input ontology. For example, block 132 refers to an estimated annual amount for the statement interest rate. Block 134 begins with the word "cinch" (which refers to a system developed by Cinch Financial, Boston, Mass.) and represents an account interest rate estimated amount.

In the example of FIG. 7, a premise 138 (User Mispricing) is to be generated by the processes 49 of the system 50 when the expression shown in block 140 is true. That expression recites a mathematical relationship to be tested using two internal data concepts 142, 144. (These internal data concepts are part of the internal ontology of the technology 40 and are generated by the technology for use by the processes 49 of the system 50.) The internal data concept 142 is generated by a mapping that combines an internal data concept 146 and internal data concepts 148, 150, the values for which are generated by fair price models. (Additional information about how the fair price models may be implemented is described in U.S. patent application Ser. No. 14/989,935 mentioned earlier.) Internal data concept 146 in turn is generated by a mapping from internal data concepts 152 and 154. A mapping 156 generates the internal data concept 152, for example, from internal data concepts 160, 162, 164, 166. The pairs of internal data concepts 160, 162 and 164, 166 are produced by similar mappings 168, 170, and 172, 174 applied to input data values for two different credit cards as shown.

The mapping 168 uses an input data concept 180 from the MX source, an internal input data concept 134 derived (by a simple mapping 139) from input data concepts 132 and 133, and a tested input from a user 182.

The internal data concept 162 is fed back from the mapping 156 as a way to check the appropriateness of one of the internal data values used in the mapping. A mapping 170 tests those values against input data values from two sources 190, 192. If an error results from applying the mapping, then the user is asked for the correct input data value 194.

At run time, an engine in the technology 40 will continuously execute the mappings on the input data values according to the current versions of the mappings that result from the work of the administrator and will provide the mapped internal data values to the processes that execute other mappings to produce other internal data values. The generated data values shown in FIG. 7 then can be used as inputs to processes 49 (FIG. 2) which generate premises and outputs for the end user.

In some implementations, as illustrated in FIG. 7, there can be two styles of mappings: simple and dynamic. A simple mapping is a direct static translation from an input data concept to an internal data concept of the kind illustrated as mapping 139 from block 132 to block 134 in FIG. 7.

An example of a dynamic mapping is illustrated by the set of blocks 200 in FIG. 7. There the mapping includes a mapping block 168. The internal data values generated by the mapping for the internal data concept of block 160 are not static but are only determinable at run time based in part on the comparisons of data values and on the input of the user.

FIG. 7 also illustrates a second dynamic mapping example 202 that involves applying a given mapping more than once to different sets of data values (for example associated with two different credit cards of a given end user) and then aggregating the data values.

Therefore, mappings can be both dynamic (in the sense that a specific current version of a mapping can produce different values at run time depending on the circumstances) and configurable (in the sense that the current version of a mapping can be changed by the administrator at any time up to and including run time) or both.

In some implementations, the mappings, ontologies, and data concepts are expressed and updated by the administrators in a source text file 57 (FIG. 2) through the administrative user interface 56 (which in some cases can be a simple text editor), in forms of expression that are conveniently understood by humans.

As suggested, for example, by FIG. 7, it is desirable for the system that we are describing to have accurate current internal data concepts and internal data values for all or as many as possible of the accounts (e.g., credit card accounts) of each of the users, and to be able to treat as a single consistent account duplicate internal data concepts or duplicate internal data values for such an account. For example, if the system is to generate an internal data value representing an internal data concept for an aggregate current credit debt balance, it is important that the credit debt balance for each account be counted once and only once.

Therefore, as part of building an internal ontology of internal data concepts for a given user, in some implementations, the system, in cooperation with the user, identifies as many accounts (credit card accounts, for example) of the user as possible, identifies two or more accounts that are duplicative in representing a single account, and then treats the two or more accounts as a single account for purposes of use corresponding internal data values for computational purposes. In some cases, the process of generating the complete set of accounts (and identifying duplicative account information) is implemented as part of an onboarding process for a new user and can be repeated from time to time with the user to assure that the set of accounts is up-to-date and treated non-duplicatively. An example of a portion of an internal ontology for a given user that identifies the unique internal data concepts for a set of credit card accounts of a user is shown below.

```
"accounts": [
    {
        "source": {
            "value": "credit_source",
            "type": "enum",
            "name": "user.accounts[ ].source"
        },
        "number": {
            "value": "X1110",
            "type": "masked_string",
            "name": "user.accounts[ ].number"
        },
        "new": {
            "value": true,
            "type": "boolean",
            "name": "user.accounts[ ].new"
        },
        "last_statement_month": {
            "value": "2016-11",
            "type": "month_date",
            "name": "user.accounts[ ].last_statement_month"
        },
        "last_statement_balance": {
            "value": 1000,
            "type": "usd",
            "name": "user.accounts[ ].last_statement_balance"
        },
        "institution_name": {
            "value": "CBNA",
            "type": "string",
            "name": "user.accounts[ ].institution_name"
        },
        "id": {
            "value": "17f018e0-09bc-49bb-a40a-d856f0180a29",
            "type": "string",
            "name": "user.accounts[ ].id"
        },
        "credit_limit": {
            "value": 2500,
            "type": "usd",
            "name": "user.accounts[ ].credit_limit"
        },
        "balance": {
            "value": 960,
            "type": "usd",
            "name": "user.accounts[ ].balance"
        },
        "association_status": {
            "value": "unprompted",
            "type": "string",
            "name": "user.accounts[ ].association_status"
        },
        "associated_institution_name": {
            "value": "CBNA",
            "type": "string",
            "name": "user.accounts[ ].associated_institution_name"
        },
        "account_type": {
            "value": "credit_card",
            "type": "enum",
            "name": "user.accounts[ ].account_type"
        }
    },
    {
        "source": {
            "value": "transaction_source",
            "type": "enum",
            "name": "user.accounts[ ].source"
        },
        "number": {
            "value": "1110",
            "type": "masked_string",
            "name": "user.accounts[ ].number"
        },
        "new": {
            "value": false,
            "type": "boolean",
            "name": "user.accounts[ ].new"
        },
        "institution_name": {
            "value": "Cinch Financial V2",
            "type": "string",
            "name": "user.accounts[ ].institution_name"
        },
        "id": {
            "value": "c69185f3-752e-42f8-a7ba-daa876a1bc69",
            "type": "string",
            "name": "user.accounts[ ].id"
        },
        "credit_limit": {
            "value": 2600,
            "type": "usd",
            "name": "user.accounts[ ].credit_limit"
        },
        "balance": {
            "value": 1100,
            "type": "usd",
            "name": "user.accounts[ ].balance"
        },
        "authentication_status": {
            "value": "complete",
            "type": "string",
            "name": "user.accounts[ ].authentication_status"
        },
        "association_status": {
            "value": "unprompted",
            "type": "string",
            "name": "user.accounts[ ].association_status"
        },
```

-continued

```
        "account_type": {
            "value": "credit_card",
            "type": "enum",
            "name": "user.accounts[ ].account_type"
        },
        "account_site_id": {
            "value": "AV0VvIKsQJP21Z5LhQtr",
            "type": "string",
            "name": "user.accounts[ ].account_site_id"
        }
    }
}
]
```

Figure 8:
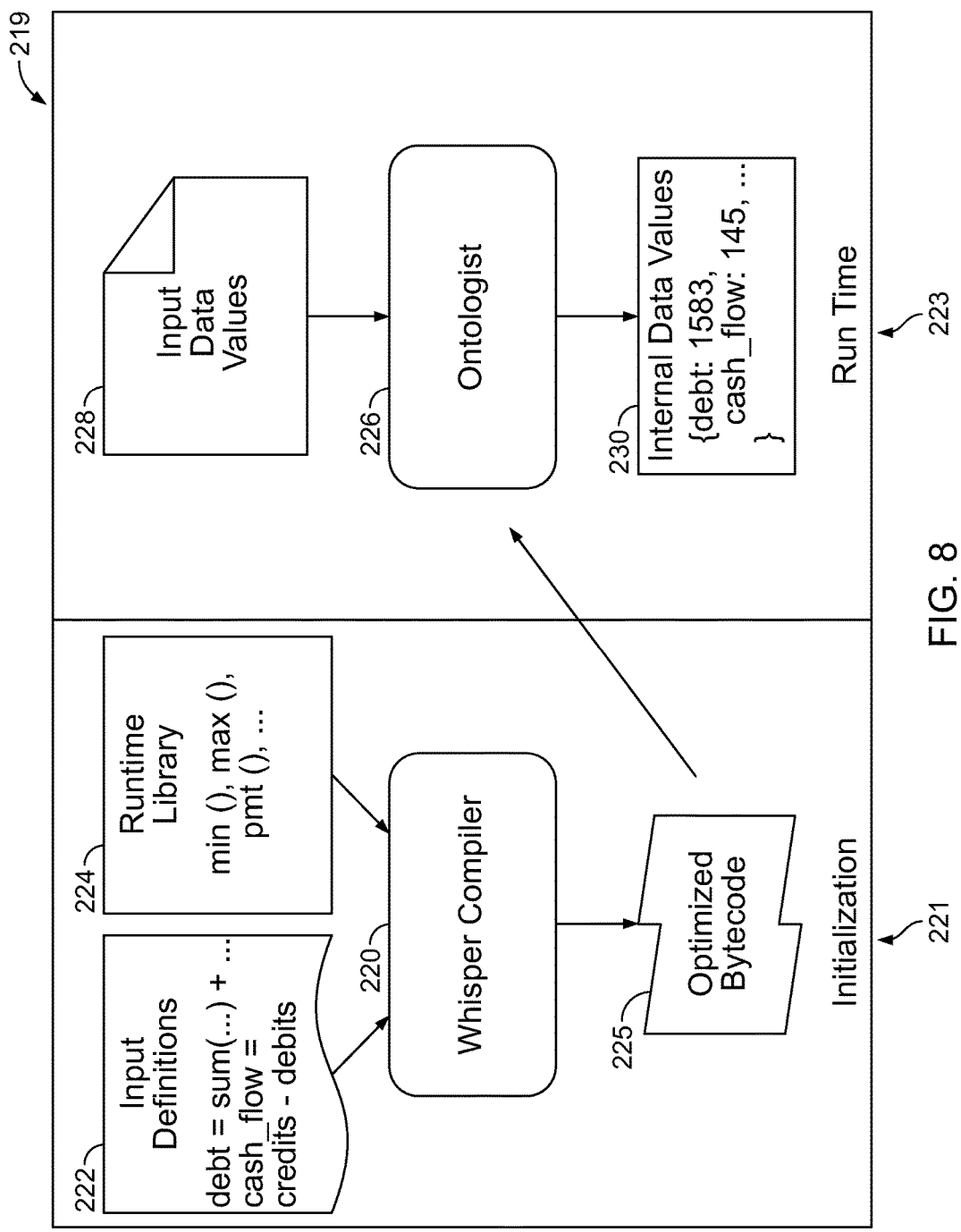
Figure 9:
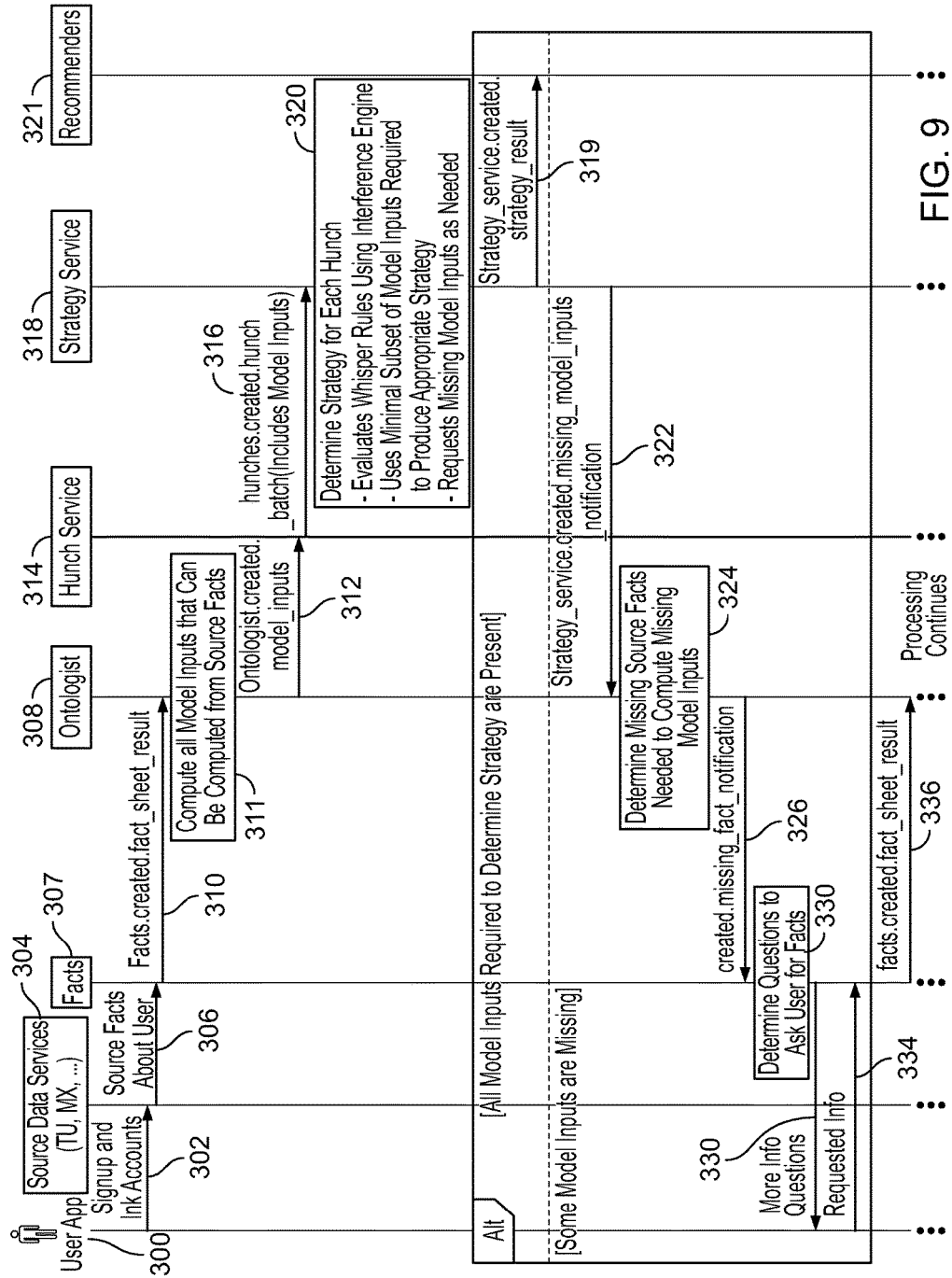

As shown in FIG. 8, operation of the runtime engine 219 that is part of the technology 40 includes an initialization phase 221 and a run time phase 223. The initialization phase prepares the engine for run time and is executed when the technology is started up and when any of the input data concepts or mappings is updated by an administrator during runtime of the system 50.

During the initialization phase, a compiler 220 uses the data concept, recipe, and mapping definitions 222 contained in the source text file and runtime libraries 224 to generate optimized executable bytecode 225 that is executed at run time by an ontology process 226 (the engine of the technology 40). Process 226 runs the bytecode in effect to apply the definitions 222 to the input data values 228 to map them to internal data values 230 which can be used by the premise generators to produce premises and outputs for delivery to the end users. Compilation of the source file is fast, and the compiled bytecode enables fast execution. During the run time phase, multiple instances of the runtime engine run in parallel serving end user requests and enabling end user guidance. By effecting rolling re-initializations of the instances, the technology can adjust to changes made by administrators to the mappings, definitions, and ontologies, essentially in real time with respect to the activities of the end users, and therefore continue to provide guidance to the end user without interruption.

For purposes of expressing the input data concepts, the internal data concepts, their meanings, the mappings, and the ontologies, the technology uses an expression language. An example of a definition of a data concept is the following.

Name: user.total_current_debt
Description: the sum of all debt the user holds
Formula: user_profile_debt_amount Examples of definitions related credit card accounts of a user are shown below.

Name: credit_card_accounts[ ]
Description: All credit cards for the user
Formula: filter("account_type", accounts[ ], "eq", "credit_card")
Name: user.credit_card.all.credit_limit
Description: sum of total credit limit for all credit cards
Formula: sum(_credit_card_accounts[ ].credit_limit)
Name: user.credit_card.all.ending_balance
Description: sum of ending balance for all credit cards
Formula: sum(_credit_card_accounts[ ].ending_balance)

Each data concept as expressed in the text file includes:

Name: a unique name of the data concept. The first character of the name must be alphabetic or an underscore [A-Za-z_]. Each remaining character can be an alphanumeric or an underscore [a-zA-Z0-9_]. Compound names in which the portions of the name are separated by period characters, for example user.total_current_debt, imply a hierarchy (ontology) in which the periods delimit branches that can be used for grouping related data concepts.

Type: an optional code used to impart additional meaning to the data concept. Type is similar to a data type, but is less strict in that the value and interpretation of Type is up to the application and is not enforced in the language itself. Type is optional. If supplied, it must come between Name and Description. Type can be used by user interfaces to inform the presentation of the data concept. For example, the type usd indicates a data concept that is in US dollars and can be formatted accordingly.

Description: a textual description of the data concept, which can be multiple lines. Along with the Name, the Description supplies meaning to (defines) the data concept.

Formula: an arithmetic definition of the data concept. Can reference input data concepts as well as internal data concepts.

Data concepts can be scalar quantities like the integer 42 or the string "good". Data concepts can also be lists of scalars like [1, 2, 4], objects such as:

{
"name": "main checking account",
"balance": 500.00
} or lists of objects.

In the example above the formula is a simple reference to an input concept, but formulas can be arithmetic expressions as well. Some examples:

Name: y
Formula: x+1
Name: z
Formula: (y*2)+1

At runtime the above formulas require a value of x to be input in order to compute y and z. If a value of 10 is supplied for x, then y will be computed to be 11 and z will be computed to be 23. Below are other examples of internal data concepts including formulas used to determine them from other data concepts. These examples would be stored in the text file and could be text edited in that file to add, remove, and update the entries.

Arithmetic expression in function call
Name: user.allocatable_lump_cash
Type: usd
Description: allocatable one-time cash
Formula: max (user.total_cash−user .working_capital *1.5, 0
Count of a list
Name: user.credit_card .all.count
Type: int
Description: number of total credit cards a user has
Formula: count (credit_card.accounts[ ])
Summing property of a list of objects
Name: user.credit_card.all.minimum_payme nts
Type: usd
Estimated: true
Description: sum of minimum payments on all credit cards
Formula: sum(credit_card .accounts [ ].mx .payment_minimum_estimated_amount
Nested function calls
Name: category.top_ranked_name
Type: st ring
Description:
Formula: if(category .consumption .rank=1, 11 consumption11,
if(category .savings .rank=1, "savings",
if(category.debt.rank=1, "debt", if(category .protection.rank=1, "protection", "unknown"))))

Following is a more complicated example.

Complicated formula example showing the use of a function from an extension
library ML.loan_approval_model1( ) which takes many arguments Name: user.personal_loan .likely_preapproved
Type: Boolean
Description: likely to be pre-approved for a personal loan
Formula: (ML.loan_approval_model1(user.credit_card .revolving .ending_balance,
  user. credit_score, user.unsecured_debt_obligation_to_income_ratio,
  user. employed_less_than_a_year)>0.5)
  and (ML .loan_approval_model2(user.credit_card .revolving .ending_balance, 36,
  user.gross_annual_income,
  user.employed_less_than_a_year, user.public_delinquencies,
  user.public_derogatory_marks, user.credit_inquiries,
  user.debt_accounts,
  user.credit_card.all.utilization, user.public_bankruptcies,
  user.tax_liens,
  user.credit history)>0)
  and (ML .loan_approval_model2(user.credit_card .revolving.ending_balance, 60,
  user.gross_annual_income,
  user.employed_less_than_a_year, user.public_delinquencies,
  user.public_derogatory_marks, user.credit_inquiries,
  user.debt_accounts,
  user. credit_card .all.utilization, user.public_bankruptcies,
  user.tax_liens,
  user.credit history)>0)

A standard function library is included in the engine of the technology. Functions provided by the library can include:

Name: credit_card_payment
Formula: max(minimum_payment, suggested_payment)
The above sets the credit_card_payment model input to the larger of the minimum_payment and the suggested_payment. The following standard library functions are available:

abs(x)—absolute value of x
ceil(x)—smallest integer>=x
count(list)—number
exp(x)—Euler's number e raised to the power of x
filter(name, list, op, value)—find the elements of list whose property name matches the condition specified by op and value.

For example: filter("balance", user.checking_accounts, "gt", 1000) returns a list of checking accounts that have a balance greater than 1000.

floor(x)—largest integer<=x
if(test, trueValue, falseValue)—Return trueValue if test is true else return falseValue
log(x)—natural logarithm (base e) of x
max (x, y, . . . )—largest value in arguments (accepts list or any number of arguments)
mean (x, y, . . . )—arithmetic mean of arguments (accepts list or any number of arguments)
nper(r, pmt, pv)—# of payments of periodic payments of a given amount required to payoff a debt
pmt(r, nper, pv)—periodic payment amount required to payoff a debt in a given time
min(x, y, . . . )—smallest value in arguments (accepts list or any number of arguments)
sum (x, y, . . . )—sum of arguments (accepts list or any number of arguments)

Functions can be used anywhere values can be used, so they can nest.

In addition to the standard library, additional function libraries are easy to add to the runtime engine. The ontology process includes a machine learning library that predicts loan approval and APR based on model inputs.

The engine is also used to define business rules, that is, recipes for output guidance (advice) to end users. A business rule is a condition and a result that applies if the condition is true. A set of ordered rules form a decision tree: the result of applying the ruleset is the result of the first rule whose condition is true.

Here is a sample simplified ruleset:
rule
if debt<$10
advise: no_financing_needed reason:
you_are_good
rule
if fico>650
advise: personal_loan reason:
lowest_rate_for_you The above ruleset produces the no_financing_needed advice when debt is <$10. Otherwise if fico is >650 the ruleset produces the personal_loan advice. Otherwise there is no output produced.

A ruleset can also produce values for named internal data concepts instead of or in addition to advice:
rule
if debt<$10
{
estimated_one_time_cash: 500
estimated_recurring_cash: 200
estimated_impact: 10
}
where the key/value pairs in curly braces are output values.

The defined mappings, input data concepts, internal data concepts, recipes, and ontologies of the source file can be changed at any time up to and during run time, through the user interface, after which the source file is recompiled.

As shown in FIG. 9, in an example sequence of operation of the technology 40 and the overall system 50, an end user application 300 (accessible, for example, through a web browser or a mobile app) enables the end user to sign up and link her financial accounts 302 to the technology 40, as part of the onboarding process mentioned earlier. Input sources of data values 304 are then able to provide input data values 306 (which we sometimes call "source facts") to a database 307 for staging. The ontology process 308 applies mappings 311 to the input data values 310 identified in accordance with the input ontology to generate internal data values 312 identified in accordance with the internal ontologies for which there are available input data values necessary to apply to the mappings. Premises generators 314 (here called a hunch service) use the generated internal data values to generate premises and pass them with internal data values 316 to a strategy process 318 (which is sometimes referred to as a model). The strategy process generates outputs 319 for delivery to recommenders 321 which will provide guidance to the end user. In some implementations, the premise generators 314 (hunch service) and the strategy service 318 operate by running rules of the kind illustrated in the very simple version of the ruleset shown above, and returning the resulting outputs. The strategy process performs at least the following functions 320: a. determines a strategy for the end user based on the generated premises; to do so, it applies the stored mappings to the generated internal data values; b. uses a minimal set of input data values to do a.; and c. when information necessary for generating the output is missing, seeks the missing information.

As part of the onboarding process, the system interacts cooperatively with the user through the web browser or mobile app in a way to identify accounts of the user and to attempt to assure that the user accounts are identified accurately, that all accounts are identified, and that accounts that are actually one and the same (i.e., a single) account are treated as being a single account.

We use the term "user account" broadly to include, for example, any record maintained by one party with respect to its ongoing (e.g., transactional) relationship with another party (such as its customer or user) and in which transactions or activities for the account are recorded. Examples of a user account include a financial account, a consumer account, a user account, a credit card account, a debit card account, a bank account, a checking account, a savings account, a mortgage account, an investment account, an insurance account, a service account, a telephone service account, a health care account, a travel account, or a tax account, to name a few.

One way for the system to accumulate identification information and access (authentication) credentials about a user's accounts would simply be to ask the user to identify each such account and provide the access credentials (which will be needed by the system in order to be able to treat the accounts as sources of input data values at run time) by entering them through the user interface.

Here we describe an especially effective way to engage the user in a cooperative interactive process of accumulating user account identification information.

Figure 11:
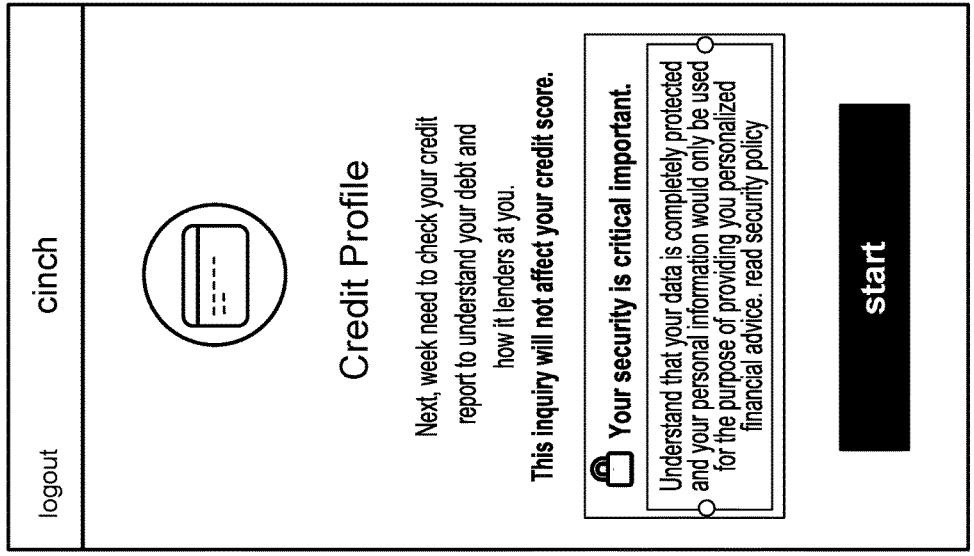

The process (illustrated by smart phone screen shots in FIGS. 10 through 23) begins with the system inviting the user to link her accounts to the system (FIG. 10) and advising the user about the credit profile information that will be obtained in her credit report (FIG. 11). Next the user enters personal information that is used both for building internal data values for the internal ontology maintained for this user, to create a system account for the user, and to provide authentication information (credentials) to enable the system to log into and obtain credit report information from a data source such as Experian or Equifax (FIG. 12).

The system then uses the authentication information to log into the credit data source and accumulates information about each of the credit card accounts referenced in the credit report.

The accumulated information for each credit card account can include the name of the creditor, the account number, the credit limit, the last statement balance, and any other information that is available. The system stores the accumulated information as internal data values based on internal data concepts that are part of the internal ontology for this user and the account.

The system then presents a list of the credit card accounts (FIG. 13) to the user. The entry for each card on the list includes the name of the creditor, a portion of the account number, the credit limit, and the last statement balance. The information presented on the screen is only a portion of the information available in the user's credit report, all of which is acquired by the system using the user's authentication information. The screen of FIG. 13 also includes (at the top) information intended to give the user confidence in the competence, honesty, and objectivity of the system by providing an encouraging accurate critique of the credit score and reporting accurate information acquired from the credit report.

Figure 13:

When the user clicks "Next" on the screen of FIG. 13, she is presented the screen of FIG. 14 asking her to identify (link) a primary bank checking account to the user's system account in the system that we are describing here. The user enters the institution name of the primary banking institution (or identifies it in a pre-populated list) and then is presented the screen of FIG. 15, on which she enters the authentication information for that account and clicks on "submit." The screen of FIG. 15 also includes a notice (at the bottom) that continues to develop confidence in the user in the reliability and trustworthiness of the system.

Figures 15, 16:

When the user has completed the information on the screen shown in FIG. 15, and clicks on "next," the system logs into the user's primary bank account and accumulates information at both the account level (name of the account, total balance, account number, and other data) and at the transaction level (debits and credits by date and amount and payee for each of the transactions in the checking, savings, and related credit card accounts). All of this information is stored as internal data values corresponding to internal data concepts of the internal ontology for this user.

Although, in this example, the interaction with respect to only a primary bank account is shown, the system encourages the user to enter information about every financial account of the user (and then logs into and fetches information from those accounts) so that the system has a complete picture of the user's accounts.

In the example shown in the figures, the user's primary bank account carries a credit card that the system is able to present to the user to have her verify a match with one of the credit card accounts obtained from the credit report, that is the system is able to determine that the two credit card accounts are possibly one and the same single credit card account. To confirm that the system has correctly matched the two accounts, the system presents (FIG. 16) internal data values for the credit card account information obtained from the primary bank. In other words, the system believes that the credit card for which information is shown in FIG. 16 likely matches the entry for the credit card account shown on FIG. 13 and shows this information on the screen of FIG. 16.

When the user clicks the "next button" on FIG. 16, she is presented a screen (FIG. 17) that shows the credit card account information from FIG. 16 at the top and the list of credit card accounts from the credit report at the bottom. The user is invited to indicate which of the credit card accounts from the credit report matches the credit card account from the primary bank (or to indicate that none of the matches).

Figure 18:
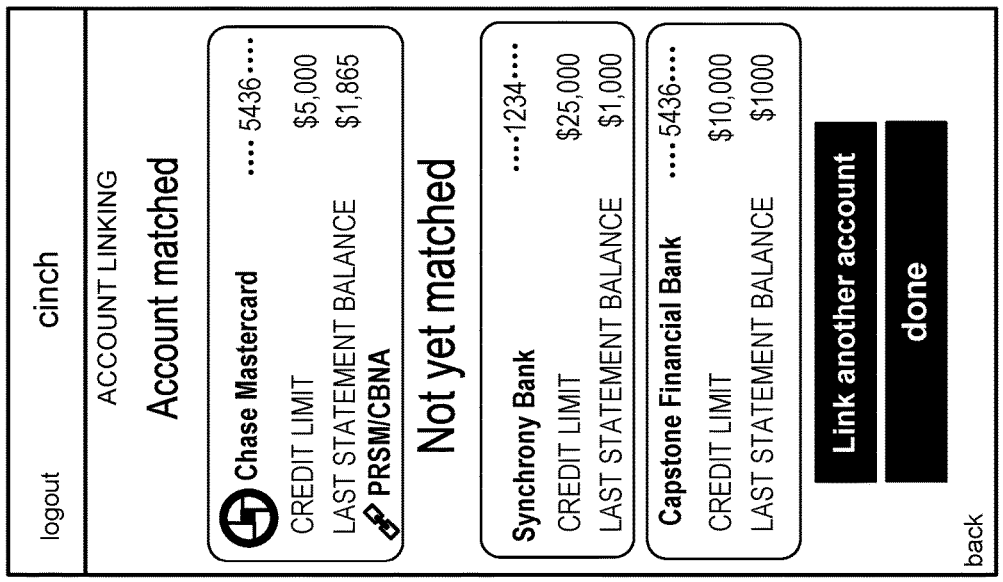

When the user clicks on one of the credit card accounts from the credit report, she is presented the screen of FIG. 18 showing the matched account at the top. A link symbol in the lower left corner of the card identifies the matched account. The credit card account now shows the credit limit because the system was able to obtain the credit limit from the primary bank.

The internal ontology in the system for this user captures and retains the matching relationship by holding internal data values for each of the credit card accounts that is part of the match and also by holding an internal data value that represents the determination by the system that the match has been made correctly. An example of this arrangement is shown below.

```
"accouts": [
    {
        "source": {
            "value": "combined_source",
            "type": "enum",
            "name": "user.accounts[ ].source",
        },
        "number": {
            "value": "1110",
            "type": "masked_string",
            "name": "user.accounts[ ].number",
        },
        "new": {
            "value": false,
            "type": "boolean",
            "name": "user.accounts[ ].new",
        },
    "last_statement_month": {
            "value": "2016-11",
            "type": "month_date",
            "name": "user.accounts[ ].last_statement_month",
        },
        "last_statement_balance": {
            "value": 1000,
            "type": "usd",
            "name": "user.accounts[ ].last_statement_balance",
        },
        "institution_name": {
            "value": "Cinch Financial V2",
            "type": "string",
            "name": "user.accounts[ ].institution_name",
        },
        "id": {
            "value": "ff1c3713-88ac-4612-9c29-38ad6c0db5b4",
            "type": "string",
            "name": "user.accounts[ ].id",
        },
        "credit_limit": {
            "value": 2500,
            "type": "usd",
            "name": "user.accounts[ ].credit_limit",
        },
        "balance": {
            "value": 1000,
            "type": "usd",
            "name": "user.accounts[ ].balance",
        },
        "association_status": {
            "value": "prompted",
            "type": "string",
            "name": "user.accounts[ ].association_status",
        },
        "associated_institution_name": {
            "value": "CBNA",
            "type": "string",
            "name": "user.accounts[ ].associated_institution_name",
        },
        "account_type": {
            "value": "credit_card",
            "type": "enum",
            "name": "user.accounts[ ].account_type",
        },
        "account_site_id": {
            "value": "AV0VvIKsQJP21Z5LhQtr",
            "type": "string",
            "name": "user.accounts[ ].account_site_id",
        }
    }
]
```

In addition, the system creates a rule for generating internal data values for the matched account based on input data values from each of the sources with respect to that single account. For example, during runtime, the system can execute a rule that normally uses internal data values derived from the primary bank records when performing computations and presenting strategies to the user that relate to the matched accounts. Or the rule could rely instead on the credit report record in some cases, or on a combination of both the credit report and the bank account in some cases. An example of such as situation is shown below.

Name: _accounts[ ].association_status
Description: Has the user been prompted to associate this account—'unprompted', 'prompted';
  'not_applicable' for non-credit cards
Formula: if(_accounts[ ].account_type !="credit_card", "not_applicable",
  first_default(accounts[ ].user_input.association_status, "unprompted"))
Name: _accounts[ ].source
Formula: if(_accounts[ ].tu_source="credit_source",
  if(_accounts[ ].mx_source="transaction_source", "combined_source", "credit_source"),
  "transaction_source")
Name: _accounts[ ].is_store_card
Formula: if (accounts[ ].tu.type="CH", true, false)
Name: _accounts[ ].institution_name
Formula: first(accounts[ ].mx.institution, accounts[ ].tu.name)
Name: _accounts[ ].associated_institution_name
Formula: accounts[ ].tu.name
Name: _accounts[ ].number
Formula: first(accounts[ ].mx.number, accounts[ ].tu.number)
Name: _accounts[ ].ending_balance
Formula: first(accounts[ ].mx.balance, accounts[ ].tu.balance, accounts[ ].user_input.balance)
Name: _accounts[ ].credit_limit
Formula: if(accounts[ ].mx.credit_limit>=250, accounts[ ].mx.credit_limit,
  first(accounts[ ].tu.credit_limit, accounts[ ].user_input.credit_limit))

Figure 17:

The process shown in the screens of FIGS. 17 and 18 is repeated until all of the credit_card accounts identified in the credit report have been matched with credit_card account information from financial institutions identified by the user and for which the user has provided authentication information for use by the system.

Although we have discussed a process specifically involving credit_card_accounts, similar processes can be used to cooperatively and interactively work with the user to match and identify any kind of user account.

Figure 19:
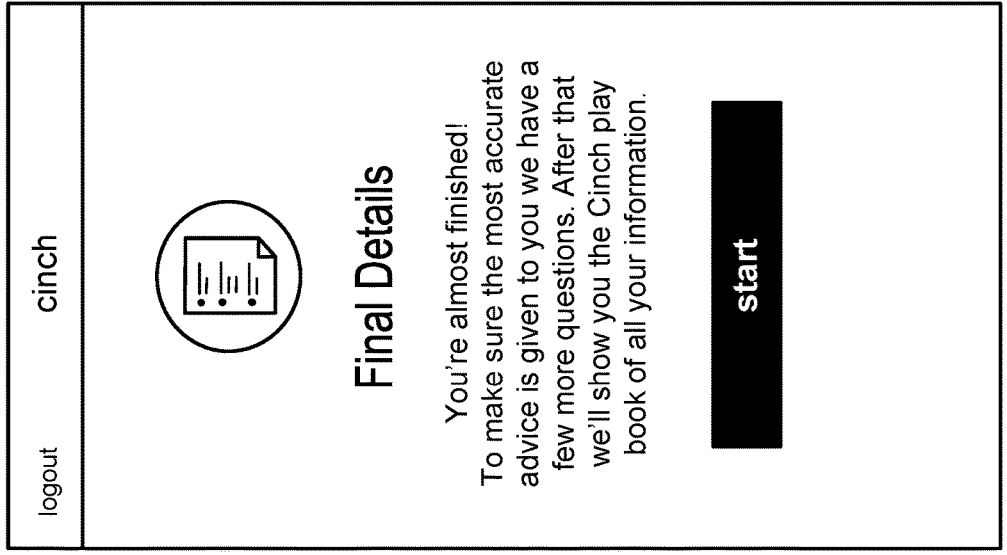

When the user clicks on the "done" button on FIG. 18, she is presented the screen of FIG. 19, which provides a notice enhancing the user's confidence in the system.

When the user clicks the "start" button, she is presented the screen of FIG. 20 that asks her for information known personally to her, in this case whether she pays the credit card balance in full every month on the indicated credit card account. She can click either "yes" or "no" and is then presented the screen of FIG. 21. Whichever answer she gives, the system adds an internal data value to the ontology for her, and asks her about other cash, giving her the option of clicking "yes" or "no".

At this stage in the process, and at other times during the operation of the system, a wide variety of questions can be posed to the user to enable the system to develop a more complete set of internal data values describing the user and the user's accounts and financial situation. These questions may include additional account level details that are needed or missing from her credit profile or linked accounts (e.g., missing APR or account "pay in full" status) and other questions that increase the system's depth of understanding of the user's financial situation (e.g., other money or planned future expenses the system can benefit from knowing about).

Which information a user is asked about (and in some cases required to provide), for example, account information, is determined by the system based upon the internal data values already acquired and available to the system about the user and the user's accounts, for example information provided from primary data sources. If information available from those sources is "complete" for the user's situation, the user need not be asked additional questions. But if, for example, none of the data sources could provide information about whether an account has been paid off each month, and the internal ontology of the system requires that information, the system determines it needs to obtain that from the user and prompts are with a question.

More generally, the internal ontology of the system can be defined to include internal data concepts and relationships among them that are required or useful for the system as it performs computations and develops and provides strategic and other advice to a user. Certain portions of the internal ontology may represent internal data concepts that are useful for, necessary for, or critical to the operation of the system during run time. Over time, the system populates the internal ontology for a given user with internal data values for each of the internal data concepts of the internal ontology. As discussed here, this can be done partly by using authentication information provided by the user to obtain data values from protected sources, partly by obtaining information from publicly available sources, and partly by asking the user for information, among other ways. The system can probe the internal ontology for a user at any time to identify internal data concepts for which no internal data values have yet been acquired and, when necessary, can go to external sources to get those internal data values, including asking the user.

Figure 10:
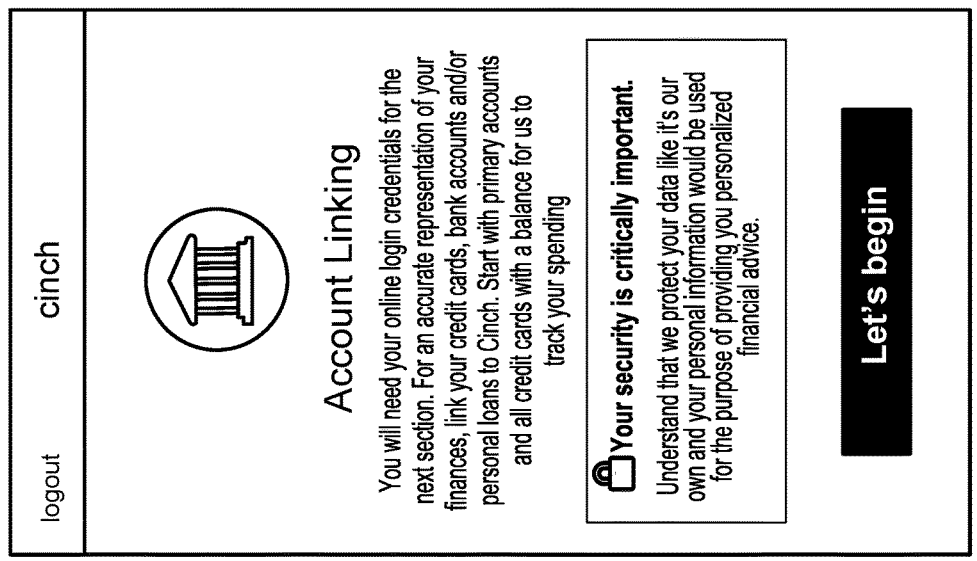

Thus, for example, referring again to the bottom portion of FIG. 10, if not all input data values needed for generating the strategies are present, the strategy process returns a notification 322 to the ontology process. The ontology process determines 324 missing input data values that will be needed to complete the mappings to the needed internal data values that are missing. Then the ontology process sends a notification 326 to the database 307, which determines 330 what questions to ask the end user in order to obtain the missing input data values. The questions 332 are sent to the end user through the end user interface. The requested information is returned 334; is converted to an expression of the missing input data values 336 which is returned to the ontology process and the remaining sequence is followed as discussed earlier. In some cases, other methods could be used to generate the missing data values.

After clicking one of the buttons on FIG. 21, the user is presented the screens of FIGS. 22 and 23 that report to her in several sections information that the system now believes it knows about her financial condition in several categories, including "money in and money out", "debt and credit", "available cash", "linked accounts", and "other". The linked accounts shown in the screen of FIG. 23 are a listing of the accounts a user has linked with the system outside of their credit report.

The screens of FIGS. 22 and 23 represent important steps in the trust-building process with the user. If the user recognizes herself and her financial situation in the "playback" of the screens of FIGS. 22 and 23, she is more likely to trust future strategic advice from the system. The user has the opportunity to edit any of her responses or link additional accounts to ensure that the system has a robust view of her financial situation.

Once this process of acquiring account and other financial information from the user has been completed (or updated), the system has stored as internal data values corresponding to internal data concepts of the ontology, information that can be used in executing computational rules and in giving reports to the user and providing strategies and other guidance and interaction.

Thus, in effect, the account linking part of the process of on-boarding (or updating information about) a user can be based on acquiring two (or more) sets of input or internal data values for a given account and then cooperatively and interactively working with the user to correctly match accounts so that every account of the user is included in the ontology of the system and two or more matched accounts can be treated by the system as a single account for purposes of executing computational rules.

For example, if the credit report contained three accounts and the user linked two accounts the ontology would reflect five total accounts. This may be inaccurate if some of the linked accounts are, in fact, the same as accounts represented in the credit report.

The association (matching, linking) of an account from one data source with an account from another data source (credit report) resolves the ontology question of whether these are alternative views of the same account entity. This enables the runtime evaluation of the ontology to choose which information from either or both sources will be used to establish a unified view of that account entity.

For example, an expression like this: first(accounts[ ].mx.balance, accounts[ ].tu.balance, accounts[ ].user_input.balance) tells the system the preferred order in which accounts should be used when selecting among competing balance amounts (e.g., the balance from the MX data source, the balance from the TU data source, or the balance provided directly by the user).

In some implementations of the system, the internal relationship between the internal ontology of internal data concepts and instances of that conceptual ontology that apply to respective specific users of the system is implemented by generating and passing to system subcomponents a hierarchical JSON object, as illustrated by the examples presented earlier.

Other implementations are also with the scope of the following claims.

The invention claimed is:
1. A method comprising:
using first authentication credentials to obtain current data of an existing user account from a first party that maintains the existing user account in an ongoing relationship of the first party with a user,
using second authentication credentials to obtain putative data of one or more putative user accounts of the user from a second party unrelated to the first party,
matching the current data and the putative data to identify one of the putative user accounts for which the putative data is inferred to comprise data of the existing user account,
presenting to the user information identifying the existing user account and the one putative user account,
receiving from the user an indication that the existing user account matches the one putative user account,
maintaining an ontology of data concepts associated with the putative data about the one putative user account and the current data about the existing user account,
for a first computation that requires data of the existing user account, using at least current data obtained from the first party based on data concepts of the ontology expressed in a predefined computational rule, and for a second computation that requires data of the existing user account, using at least putative data obtained from the second party, based on data concepts of the ontology expressed in the predefined computational rule, the first computation and the second computation generating data associated with the existing user account.

2. The method of claim 1 in which the putative data obtained from the second party is used by the second party for credit reporting.

3. The method of claim 1 in which the first party comprises a financial institution.

4. The method of claim 1 in which the putative user accounts comprise credit accounts.

5. The method of claim 1 in which the existing user account comprises a credit account.

6. The method of claim 1 in which the first authentication credentials are received by interaction with the user through a user interface.

7. The method of claim 1 in which the second authentication credentials are received by interaction with the user through a user interface.

8. The method of claim 1 comprising matching (a) current data of another existing user account obtained from a third party that maintains the account in an ongoing relationship of the third party with the user and (b) putative data of the one or more putative user accounts obtained from the second party to identify another one of the putative user accounts for which the putative data is for the other existing user account.

* * * * *